United States Patent [19]
Hilfman

[11] 3,923,646
[45] Dec. 2, 1975

[54] HYDRODESULFURIZATION WITH A CATALYST FORMED FROM AN ALUMINA SOL CONTAINING ALPHA-ALUMINA MONOHYDRATE

[75] Inventor: Lee Hilfman, Mount Prospect, Ill.

[73] Assignee: Universal Oil Products Company, Des Plaines, Ill.

[22] Filed: Dec. 13, 1974

[21] Appl. No.: 532,567

Related U.S. Application Data

[63] Continuation-in-part of Ser. No. 347,589, April 3, 1973, abandoned.

[52] U.S. Cl. .................................. 208/216; 252/465
[51] Int. Cl.² ........................................... C01G 23/02
[58] Field of Search ..................................... 208/216

[56] References Cited
UNITED STATES PATENTS

| | | | |
|---|---|---|---|
| 3,726,790 | 4/1973 | Gallagher et al. | 208/216 |
| 3,846,286 | 11/1974 | Phillipson | 208/216 |

Primary Examiner—Delbert E. Gantz
Assistant Examiner—G. J. Crasanakis
Attorney, Agent, or Firm—James R. Hoatson, Jr.; Robert W. Welch; William H. Page, II

[57] ABSTRACT

Sulfur-containing petroleum hydrocarbon fractions are treated at hydrodesulfurization reaction conditions in contact with a catalytic composite comprising a Group VIII metal or metal oxide, a Group VIB metal or metal oxide, and an alumina support or carrier material. The alumina support is characterized by a method of preparation which results in improved hydrodesulfurization activity of the catalytic composite.

13 Claims, No Drawings

HYDRODESULFURIZATION WITH A CATALYST FORMED FROM AN ALUMINA SOL CONTAINING ALPHA-ALUMINA MONOHYDRATE

CROSS REFERENCE TO RELATED APPLICATIONS

This application is a continuation-in-part application of a copending application Ser. No. 347,589, filed Apr. 3, 1973 and now abandoned.

It has become well-known that oxides of sulfur, plus lesser amounts of other sulfurous compounds, are among the major pollutants of the atmosphere. It has become equally well-known that the burning or combustion of sulfur-containing petroleum hydrocarbon fractions accounts for a substantial portion of said oxides of sulfur, and legislation has been effected to prohibit or substantially limit the use of the highly sulfurous petroleum hydrocarbon fractions. Said petroleum fractions are frequently unfit not only, for example, as a fuel oil, but also for further processing in view of the sulfur sensitivity of many hydrocarbon conversion catalysts including many of the commercial hydrocracking and reforming catalysts. Petroleum hydrocarbon fractions of low sulfur concentration are in relatively short supply and it becomes increasingly important to develop improved methods of sulfur removal to treat the more accessible and abundant petroleum sources of high sulfur content.

The difficulties presented by the presence of sulfur are substantially reduced by hydrotreating the sulfur-containing petroleum fractions in contact with a catalytic composite of a Group VIII metal or metal oxide, a Group VIB metal or metal oxide, and an alumina support or carrier material. It is an object of this invention to present a method for the hydrodesulfurization of a sulfur-containing petroleum hydrocarbon fraction utilizing said catalytic composite, with the alumina support or carrier material being characterized by a method of preparation conducive to improved hydrodesulfurization activity.

In one of its broad aspects, the present invention embodies a process for desulfurizing a sulfur-containing petroleum hydrocarbon fraction which comprises passing said petroleum fraction and hydrogen in contact with a catalytic composite at hydrodesulfurization reaction conditions, said catalytic composite comprising from about 5 to about 20 wt. % Group VIB metal or metal oxide and from about 0.1 to about 10 wt. % Group VIII metal or metal oxide on an alumina carrier material, said carrier material having been prepared by admixing and suspending an alpha-alumina monohydrate in an acid anion-containing alumina sol having an aluminum/acid anion ratio of from about 1:1 to about 1.5:1, said alumina being admixed with said sol in an amount to provide, on gelation of said sol, from about 25 to about 50 wt. % of the alumina product; commingling the resulting suspension with an ammonia precursor at below gelation temperature, said precursor being decomposable to ammonia with increasing temperature; dispersing the suspension as droplets in a hot oil bath effecting decomposition of said precursor and the formation of hydrogel spheres therein; aging the spheres at an elevated temperature effecting decomposition of the residual ammonia precursor contained therein and washing, drying and calcining the aged alumina spheres.

Other objects and embodiments of this invention will become apparent in the following more detailed specification.

Hydrodesulfurization reaction conditions generally include an imposed hydrogen pressure of from about 100 to about 3000 psig. Normally, the hydrogen is charged together with recycle hydrogen to provide from about 1000 to about 50,000 standard cubic feet per barrel of hydrocarbon charge. Hydrodesulfurization reaction conditions further include an elevated temperature of from about 95° to about 425°C., although temperatures in the upper range, say from about 315° to about 425°C., are more suitable. Also, a petroleum feed stock is suitably processed over the hydrodesulfurization catalyst at a liquid hourly space velocity of from about 0.5 to about 20.

The catalytic composite of this invention comprises a Group VIB metal or metal oxide and a Group VIII metal or metal oxide on an alumina carrier material, and the method employed in the manufacture of said alumina carrier material is an essential feature of this invention as will hereinafter appear.

Spheroidal alumina particles particularly useful as a support or carrier material for other catalytic components have heretofore been prepared from an alumina hydrosol by the oil drop method substantially as described by Hoekstra in U.S. Pat. No. 2,620,314. Briefly, the method comprises commingling an alumina hydrosol and a gelling agent at below gelation temperature and dispersing the mixture as droplets in a water-immiscible suspending media, usually a gas oil, maintained at an elevated temperature whereby gelation occurs with the formation of firm, spheroidal hydrogen particles. The particles are thereafter subjected to one or more aging treatments whereby certain desirable physical characteristics are imparted thereto.

It is generally recognized that catalysis involves a mechanism not fully understood and in many cases unpredictable with respect to the activity, selectivity and/or stability of a catalyst concerning a given reaction, and even minor variations in catalyst composition or method of manufacture may provide an unexpected improvement in catalyst performance. Thus, while it has been the practice to utilize oil-dropped alumina spheres prepared substantially as described in U.S. Pat. No. 2,620,314 as a support or carrier material for Group VIB and Group VIII metals to afford a catalytic composite particularly useful as a hydrodesulfurization catalyst, it has now been found that the incorporation of alpha-alumina monohydrate in the oil-dropped alumina spheres will yield a further and unexpected improvement in the hydrodesulfurization activity of the catalytic composite.

In accordance with the present invention, the alumina admixed and suspended in the alumina hydrosol is an alpha-alumina monohydrate (boehmite), preferably a substantially pure alpha-alumina monohydrate such as is recovered as a byproduct in the manufacture of an alcohol by the hydrolysis of an aluminum alcoholate or alkoxide. Being a by-product, the last mentioned alumina is relatively inexpensive and permits a substantial reduction in the cost of manufacturing spheroidal alumina particles as herein contemplated. A particularly suitable alpha-alumina monohydrate, characterized by a crystallite size of less than about 100 Angstroms, is commercially available in a substantially pure, finely divided form under the tradename of Catapal.

The alumina hydrosol utilized herein is described as an acid anion-containing hydrosol having an aluminum/acid anion ratio of from about 1:1 to about 1.5:1. The alumina sols herein contemplated are such as are prepared by the general method whereby a suitable acid salt of aluminum, such as aluminum chloride, aluminum sulfate, aluminum acetate, etc., is subjected to hydrolysis in aqueous solution and the solution treated at conditions to reduce the resulting acid anion concentration thereof, as by neutralization, and achieve the aforesaid aluminum/acid anion ratio. Thus, the reduced acid anion concentration promotes olation and formation of inorganic polymers of colloidal dimension dispersed and suspended in the remaining liquid.

Reduction in the acid anion concentration can be effected in any conventional or otherwise convenient manner. For example, the acid anion concentration can be reduced utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired acid anion deficiency may be created simply by heating. Another method of producing a suitable alumina hydrosol is in the electrolysis of an aluminum salt solution, for example an aqueous aluminum chloride solution, in an electrolytic cell having a porous partition between anode and cathode whereby an acid anion deficiency is effected in the cathode compartment with the formation of an alumina hydrosol therein.

Preferably, the acid anion-containing alumina hydrosol is an aluminum chloride hydrosol variously referred to as an aluminum oxychloride hydrosol, aluminum hydroxy-chloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature usually from about 80° to about 105°C. and reducing the chloride anion concentration of the resulting aluminum chloride solution by the device of maintaining an excess of aluminum reactant in the reaction mixture as a neutralizing agent. In any case, the aluminum chloride hydrosol is prepared to contain aluminum in from about a 1:1 to about a 1.5:1 ratio with the chloride anion content thereof.

Pursuant to the present invention, the alpha-alumina monohydrate is admixed with the acid anion-containing alumina hydrosol to provide from about 25 to about 50 wt. % of the final alumina product. One preferred method of admixing the alpha-alumina monohydrate with the alumina hydrosol is to prepare the alpha-alumina monohydrate as an aqueous slurry and add the same to the hydrosol slowly and with stirring. The alpha-alumina monohydrate-alumina hydrosol mixture is then commingled with an ammonia precursor at below gelation temperature and dispersed as droplets in a water-immiscible suspending medium substantially in accordance with the aforementioned oil drop method of Hoekstra as described in U.S. Pat. No. 2,620,314. Thus, the alpha-alumina monohydrate-alumina hydrosol mixture is cooled to below gelation temperature, commingled with an ammonia precursor which is hydrolyzable or decomposable to ammonia with increasing temperature, and the mixture dispersed as droplets in a hot, water-immiscible suspending medium, suitably an oil suspending medium maintained at from about 50° to about 105°C., whereby said hydrolysis or decomposition is effected and gelation occurs with the formation of firm, spheroidal hydrogel particles. The ammonia precursor is preferably hexamethylenetetramine although other weakly basic materials, including urea alone or in combination with hexamethylenetetramine, which are substantially stable at below gelation temperature but hydrolyzable to ammonia with increasing temperature, may be employed. The hexamethylenetetramine, or other ammonia precursor, is utilized in an amount sufficient to effect substantially complete neutralization of the chloride or other acid anion contained in the hydrosol upon total hydrolysis. Preferably, hexamethylenetetramine is utilized in an amount equivalent to from about a 1:4 to about a 1.25:4 mole ratio with said chloride. The hexamethylenetetramine is preferably separately prepared in aqueous solution and thereafter commingled with the alpha-alumina monohydrate-alumina hydrosol mixture. The hexamethylenetetramine aqueous solution suitably comprises from about 28 to about 40 wt. % hexamethylenetetramine.

Only a fraction of the ammonia precursor is hydrolyzed or decomposed to ammonia in the relatively short period during which initial gelation occurs. During the subsequent aging process, the residual ammonia precursor retained in the spherical gel particles continues to hydrolyze and effect further polymerization of the alumina whereby desirable pore characteristics of the product are established. The spherical gel particles are aged, preferably in the alkaline oil bath, at a temperature of from about 60° to about 260°C. and at a pressure to maintain the water content of said particles in a substantially liquid phase. Preferably, the hydrogel particles are aged at a temperature of from about 60° to about 175°C. and at a pressure of from about 40 to about 150 psig whereby the water content of the particles is maintained in a substantially liquid phase. The spheroidal particles are suitably aged at the described conditions of temperature and pressure within the period of from about 1 to about 5 hours.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 95° to about 315°C. for 2 to 24 hours or more, or dried at this temperature and calcined at a temperature of from about 325° to about 750°C. for 2 to 12 hours or more, and utilized as such or composited with other catalytic components. It is preferred that the spheres be dried slowly and also that the drying be effected in a humid atmosphere since this has been found to result in less breakage of the spheres.

The spheroidal alumina particles of this invention are impregnated with a Group VIB and a Group VIII metal component to form a catalytic composite particularly useful as a hydrodesulfurization catalyst. Thus, the catalytic composite may comprise chromium, molybdenum, and/or tungsten in combination with one or more metals of Group VIII, i.e., iron, nickel, cobalt, platinum, palladium, ruthenium, rhodium, osmium and iridium. Of this Group VIB metals, molybdenum is preferred. The Group VIB metal is suitably employed in an amount to comprise from about 5 to about 20 wt. % of the final catalytic composite. The Group VIII metal, which is preferably nickel, or nickel in combination with cobalt, is suitably effective in amounts to comprise from about 0.1 to about 10 wt. % of the final catalytic composite. The Group VIB and the Group VIII metal component may be composited with the carrier material in any suitable manner. For example, the alumina carrier material can be soaked, dipped, suspended or otherwise immersed in a common solution comprising a suitable compound of a Group VIB metal and a suitable Group VIII metal compound. Alternatively, a Group VIB metal and a Group VIII metal may be composited with the carrier material utilizing individual solutions thereof and in any convenient sequence. Suitable compounds of Group VIB metals include ammonium molybdate, ammonium paramolybdate, molybdic acid, molybdenum trioxide, ammonium chromate, ammonium peroxychromate, chromium acetate, chromous chloride, chromium nitrate, ammonium metatungstate, tungstic acid, etc. Compounds of metals of Group VIII which are suitable include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric chloride, ferric nitrate, ferric sulfate, ferric formate, ferric acetate, platinum chloride, chloroplatinic acid, chloropalladic acid, palladium chloride, etc.

The final composite, after all of the catalytic components are present therein, is usually dried for a period of from about 2 to about 8 hours or more in a steam dryer, then at from about 100° to about 460°C. in a drying oven. The dried catalyst composite is thereafter oxidized in an oxygen-containing atmosphere, such as air, for a period of from about 1 to about 8 hours or more and at a temperature of from about 370° to about 650°C. whereby the Group VIB and Group VIII components are converted, at least in part, to their respective oxides.

The following example is presented in illustration of the present invention and is not intended as an undue limitation on the generally broad scope of the invention as set out in the appended claims.

EXAMPLE

Spheroidal alumina particles were prepared by first digesting aluminum pellets in aqueous hydrochloric acid at about 102°C. while maintaining an excess of the aluminum reactant in the reaction mixture. The reaction mixture was stirred at 102°C. until sufficient aluminum was digested to yield a hydrosol containing 14.20 wt. % aluminum. The resulting hydrosol had a specific gravity of 1.403, an aluminum/chloride ratio of 1.15, and contained 9.75 wt. % chloride anion. 306 grams (245 grams on a volatile free basis) of alpha-alumina monohydrate (Catapal S) was added to 1 liter of the hydrosol with stirring followed by 1 liter of a 28 wt. % aqueous hexamethylenetetramine solution. The mixture was subsequently dispersed as droplets in a column of oil maintained at 93°C. The hydrogel spheres thus formed were aged in the hot oil for 18 hours and then in a 3% aqueous ammonium solution for 4 hours. The aged spheres were then water-washed, dried at 100°C., and calcined in air for 6 hours at 650°C. The calcined alumina spheres had an average bulk density of 0.58 grams per cubic centimeter and a surface area of 194 square meters per gram.

As heretofore mentioned, the alumina spheres prepared in accordance with the method of this invention are particularly useful as a support or carrier material for Group VIB and Group VIII metal components to provide an improved hydrodesulfurization catalyst. In demonstration of the improvement resulting from the present method of manufacture, alumina spheres containing 25, 40 and 50 wt. % alpha-alumina monohydrate were prepared in accordance with the above-described method, as well as alumina spheres containing no alpha-alumina monohydrate added thereto. The catalysts are hereinafter referred to as Catalysts A, B, C and D respectively.

The alumina spheres were impregnated with molybdenum and cobalt and/or nickel. Impregnation was by means of an impregnating solution prepared by dissolving molybdic acid and cobalt carbonate and/or nickel nitrate hexahydrate in a common aqueous ammoniacal solution. The alumina spheres were immersed in the solution, soaked for about 10 minutes at ambient temperature, and the solution thereafter evaporated to dryness in contact with the spheres utilizing a rotary steam dryer. The impregnated spheres were subsequently dried at about 125°C. and calcined in air for 1 hour at 590°C.

Each of the catalysts were similarly evaluated with respect to the hydrodesulfurization of a Farmer's Union vacuum gas oil with an API at 60°F. of 20.1 and containing 2.75 wt. % sulfur. The vacuum gas oil was passed over the catalyst at a temperature of about 370°C. under 1100 psig hydrogen pressure. The vacuum gas oil was passed in contact with the catalyst at 3 liquid hourly space velocity and the hydrogen, including hydrogen recycled through a caustic scrubber, was charged in admixture with the vacuum gas oil at the rate of 3000 cubic feet per barrel of hydrocarbon charge.

The effect of the alumina support or carrier material of this invention on the improved hydrodesulfurization activity of the catalyst prepared therefrom is evident with reference to the data set out in Table I below.

TABLE I

| Catalyst | A | B | C | D |
|---|---|---|---|---|
| Alumina base | | | | |
| Boehmite alumina, wt. % | 25 | 40 | 50 | — |
| Catalytic components | | | | |
| Ni, wt.% | 4.1 | 3.6 | 3.6 | 3.6 |
| Co, wt.% | 0.4 | — | 0.05 | — |
| Mo, wt.% | 10.0 | 8.0 | 9.7 | 7.35 |
| Product | | | | |
| S, wt.% | 0.50 | 0.49 | 0.39 | 0.59 |

Although the process of the present invention is primarily directed to the hydrodesulfurization of a sulfur-containing petroleum hydrocarbon fraction, the inherent hydrogenating function of the catalytic composite employed herein is also of advantage in the preparation of substantially saturated petroleum hydrocarbon fractions for use or for further processing. The petroleum hydrocarbon fraction subject to hydrodesulfurization in accordance with the process of this invention include gasoline, naptha, kerosine, light and heavy fuel oils, gas oils including atmospheric and vacuum gas oils, and the like.

I claim as my invention:

1. A process for desulfurizing a sulfur-containing petroleum hydrocarbon fraction which comprises passing said petroleum hydrocarbon fraction and hydrogen in contact with a catalytic composite at hydrodesulfurization reaction conditions, said catalytic composite comprising from about 5 to about 20 wt. % Group VIB metal or metal oxide and from about 0.1 to about 10 wt. % Group VIII metal or metal oxide on an alumina carrier material, said carrier material having been prepared by:

a. admixing and suspending an alpha-alumina monohydrate in a chloride anion-containing alumina sol having an aluminum chloride anion ratio of from about 1:1 to about 1.5:1, said alpha-alumina monohydrate being admixed in said sol in an amount to provide, on gelation of said sol, from about 25 to about 50 wt. % of said alumina carrier material;

b. commingling the resulting suspension with an ammonia precursor at below gelation temperature, said precursor being decomposable to ammonia with increasing temperature;

c. dispersing the suspension of step (b) as droplets in a hot oil bath effecting decomposition of said precursor and the formation of hydrogel spheres therein;

d. aging said spheres at an elevated temperature effecting decomposition of the residual ammonia precursor contained therein, and e. washing, drying and calcining the aged alumina spheres to form said alumina carrier material.

2. The process of claim 1 further characterized in that said Group VIB metal or metal oxide is tungsten or an oxide thereof.

3. The process of claim 1 further characterized in that said Group VIB metal or metal oxide is molybdenum or an oxide thereof.

4. The process of claim 1 further characterized in that said Group VIII metal or metal oxide is nickel or an oxide thereof.

5. The process of claim 1 further characterized in that said Group VIII metal or metal oxide is cobalt or an oxide thereof.

6. The process of claim 1 further characterized in that said alpha-alumina monohydrate is prepared by the hydrolysis of aluminum alcoholate.

7. The process of claim 1 further characterized in that said ammonia precursor is hexamethylenetetramine.

8. The process of claim 1 further characterized in that said ammonia precursor is hexamethylenetetramine and utilized in an amount to effect substantially complete neutralization of said chloride anion contained in said hydrosol mixture.

9. The process of claim 1 further characterized in that said ammonia precursor is hexamethylenetetramine and utilized from about a 1:4 to about 1.25:1 mole ratio with said acid anion.

10. The process of claim 1 further characterized in that said oil bath is maintained at a temperature of from about 50° to about 105°C.

11. The process of claim 1 further characterized in that said hydrogel spheres are aged at a temperature of from about 60° to about 260°C. and at a pressure to maintain the water content thereof in a substantially liquid phase.

12. The process of claim 1 further characterized in that said hydrogel spheres are aged at a temperature of from about 60° to about 175°C. and at a pressure of from about 40 to about 150 psig.

13. The process of claim 1 further characterized in that said aged alumina spheres are calcined at a temperature of from about 325° to about 750°C. in an oxidizing atmosphere.

* * * * *